(12) United States Patent
Sasaki et al.

(10) Patent No.: US 9,864,150 B2
(45) Date of Patent: Jan. 9, 2018

(54) OPTICAL INTERCONNECTION COMPONENT

(71) Applicant: SUMITOMO ELECTRIC INDUSTRIES, LTD., Osaka-shi, Osaka (JP)

(72) Inventors: Takashi Sasaki, Yokohama (JP); Yasuomi Kaneuchi, Yokohama (JP); Osamu Shimakawa, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/670,334

(22) Filed: Aug. 7, 2017

(65) Prior Publication Data

US 2017/0336575 A1 Nov. 23, 2017

Related U.S. Application Data

(63) Continuation of application No. 14/652,200, filed as application No. PCT/JP2014/083389 on Dec. 17, 2014.

(30) Foreign Application Priority Data

Dec. 18, 2013 (JP) .................... 2013-261627

(51) Int. Cl.
*G02B 6/26* (2006.01)
*G02B 6/30* (2006.01)
(Continued)

(52) U.S. Cl.
CPC ....... *G02B 6/3885* (2013.01); *G02B 6/02042* (2013.01); *G02B 6/30* (2013.01);
(Continued)

(58) Field of Classification Search
CPC ........ G02B 6/02042; G02B 6/30; G02B 6/34; G02B 6/3829; G02B 6/3839;
(Continued)

(56) References Cited

U.S. PATENT DOCUMENTS

| 4,812,001 | A | 3/1989 | Tomita et al. |
| 6,402,389 | B1 | 6/2002 | Steijer et al. |

(Continued)

FOREIGN PATENT DOCUMENTS

| JP | S64-49002 A | 2/1989 |
| JP | H02-15204 A | 1/1990 |

(Continued)

OTHER PUBLICATIONS

English-language translation of International Preliminary Report of Patentability (IPRP) dated Jun. 30, 2016 that issued in WO Patent Application No. PCT/JP2014/083389.

(Continued)

*Primary Examiner* — Akm Enayet Ullah
*Assistant Examiner* — Michael Mooney
(74) *Attorney, Agent, or Firm* — Drinker Biddle & Reath LLP

(57) ABSTRACT

The present invention relates to an optical interconnection component enabling implementation of optical fiber connection with higher accuracy than by the conventional technologies. The optical interconnection component is configured to maintain arrangement of end faces of a plurality of rotationally-aligned MCFs, so as to reduce connection loss to another component. Since arrangement of the MCFs can be confirmed by markers provided on a holding portion holding the plurality of MCFs inside, it becomes feasible to achieve the optical connection with higher accuracy.

7 Claims, 6 Drawing Sheets

(51) Int. Cl.
*G02B 6/36* (2006.01)
*G02B 6/38* (2006.01)
*G02B 6/02* (2006.01)
*G02B 6/34* (2006.01)

(52) U.S. Cl.
CPC ........... *G02B 6/381* (2013.01); *G02B 6/3829* (2013.01); *G02B 6/3831* (2013.01); *G02B 6/3833* (2013.01); *G02B 6/3851* (2013.01); *G02B 6/34* (2013.01)

(58) Field of Classification Search
CPC .. G02B 6/3851; G02B 6/3831; G02B 6/3833; G02B 6/3865; G02B 6/3885
USPC ................. 385/53–94, 123–128; 65/64, 385; 264/1.24, 1.25
See application file for complete search history.

(56) References Cited

U.S. PATENT DOCUMENTS

2011/0103757 A1 5/2011 Alkemper et al.
2014/0010501 A1* 1/2014 Saito .................... G02B 6/3885
                                                              385/70
2015/0063755 A1 3/2015 Doany et al.

FOREIGN PATENT DOCUMENTS

| | | |
|---|---|---|
| JP | 2000-509839 A | 8/2000 |
| JP | 2001-228370 A | 8/2001 |
| JP | 2009-244612 A | 10/2009 |
| JP | 2010-122292 A | 6/2010 |
| JP | 2012-514768 A | 6/2012 |
| WO | WO 2008/142777 A1 | 11/2008 |
| WO | WO 2012/121320 A1 | 9/2012 |
| WO | WO 2013/047577 A1 | 4/2013 |

OTHER PUBLICATIONS

U.S. Office Action dated Aug. 18, 2016 from U.S. Appl. No. 14/652,200.
U.S. Office Action dated Sep. 28, 2016 from U.S. Appl. No. 14/652,200.
U.S. Office Action dated May 8, 2017 from U.S. Appl. No. 14/652,200.

* cited by examiner

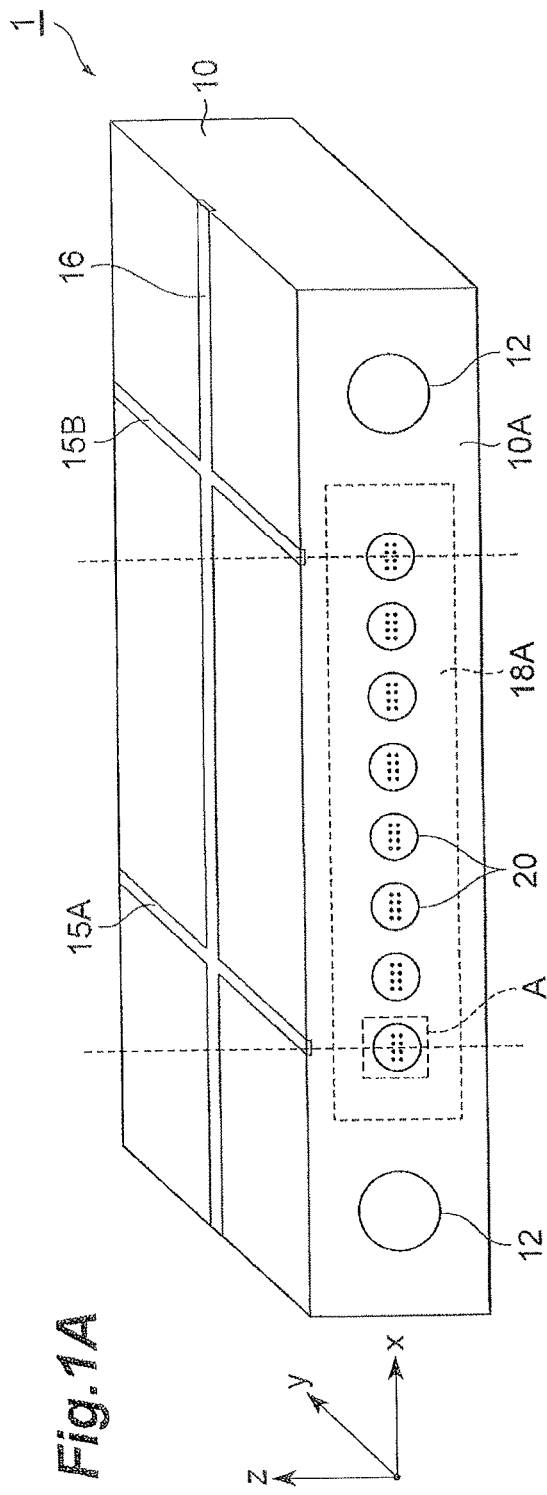
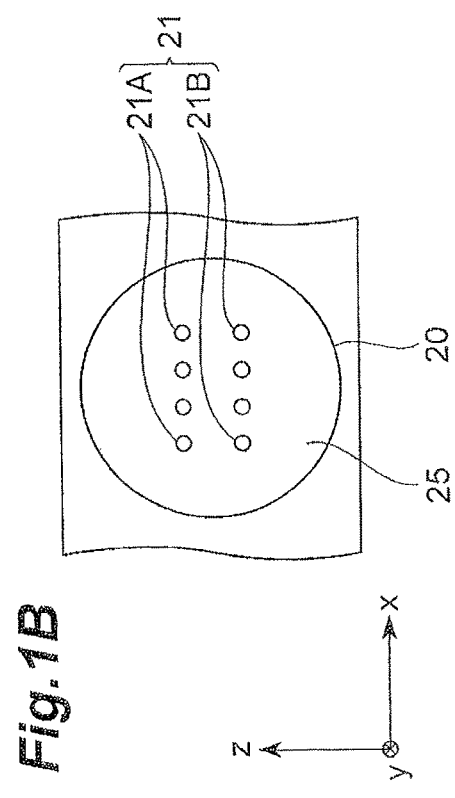
Fig. 1A
Fig. 1B

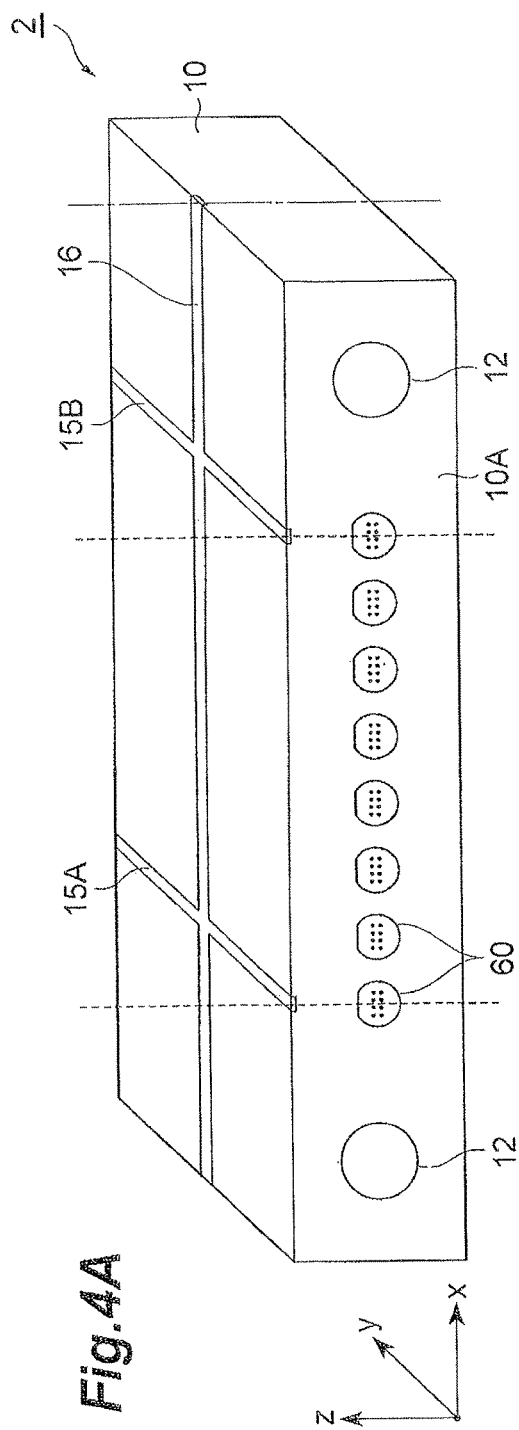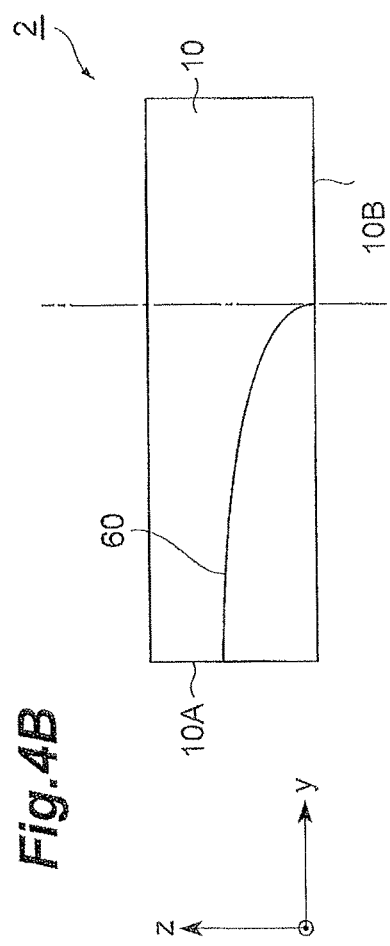

OPTICAL INTERCONNECTION COMPONENT

This is a continuation application of copending application Ser. No. 14/652,200, having a §371 date of Jun. 15, 2015, which is a national stage filing based on PCT International Application No. PCT/JP2014/083389, filed on Dec. 17, 2014. The copending application Ser. No. 14/652,200 is incorporated by reference herein in its entirety.

TECHNICAL FIELD

An embodiment of the present invention relates to an optical interconnection component in which a plurality of multi-core optical fibers (each of which will be referred to hereinafter as MCF) having respective curve portions curved into a curvature direction perpendicular to a straight line indicative of a core arrangement direction defined by two or more cores are arranged in the direction perpendicular to the curvature direction.

BACKGROUND ART

Patent Literatures 1 to 3 each disclose the conventional optical interconnection components. Specifically, Patent Literature 1 concerns an optical engine to provide a point-to-point optical communication link between devices and shows a configuration for realizing multiple optical interconnections between optical engines via a single MCF. Patent Literature 2 discloses a configuration in which a plurality of optical fiber core materials in a curved state are integrated with a ferrule. In this case, there is no need for a work of inserting optical fibers into holes of the ferrule after manufacture of the ferrule because a resin body of the ferrule also serving as cladding is integrally molded with the plurality of optical fiber core materials. Patent Literature 3 also discloses a structure in which a plurality of as-curved single-core optical fibers are integrated, as the foregoing Patent Literature 2 does.

CITATION LIST

Patent Literatures

Patent Literature 1: Japanese Translation of PCT Application Laid-open Publication No. 2012-514768
Patent Literature 2: Japanese Patent Application Laid-open Publication No. 2010-122292
Patent Literature 3: Japanese Patent Application Laid-open Publication No. H02-15204

SUMMARY OF INVENTION

Technical Problem

The Inventors conducted research on the conventional optical interconnection components and found the problem as described below. Specifically, in the methods of the foregoing Patent Literatures 2 and 3, there are no indications of core positions on the optical interconnection component having a plurality of cores. Therefore, it is not easy to find the accurate positions of the cores in changing the optical path and it is thus difficult to optically implement accurate optical connection with an optical engine. In the connection methods of the foregoing Patent Literatures 1 to 3, the curved regions are formed in the optical fibers or in the core materials per se (hereinafter referred to as the optical fibers or the like) and, for this reason, there is a possibility that degradation of crosstalk can occur due to the curvature of the optical fibers or the like, for example, after the optical interconnection component is mounted. Since each MCF has a plurality of cores, a core arrangement structure thereof needs to be matched with that of a connection target MCF. If consideration is given to connection between optical interconnection components having a plurality of MCFs, it will be necessary to match the positions of the core arrangement structures in the respective MCFs, as well as the positions of the respective MCFs.

The present invention has been accomplished in order to solve the problem as described above, and it is an object of the present invention to provide an optical interconnection component capable of realizing optical connections between a plurality of cores in respective MCFs with higher accuracy and more easily than by the conventional technologies.

Solution to Problem

An optical interconnection component according to the embodiment of the present invention comprises a plurality of MCFs, and a holding portion for holding these MCFs in a curved state. Each of the plurality of MCFs includes a plurality of cores extending along a longitudinal direction thereof. The holding portion is comprised of a predetermined plastic material covering each of the MCFs. The holding portion integrally holds the plurality of MCFs inside while relative positions among the MCFs are fixed. Particularly, in the embodiment of the invention, each of the plurality of MCFs has a core arrangement comprised of first linear arrangement elements including two or more cores arranged on a first straight line, in a cross section thereof perpendicular to the longitudinal direction, and a curve portion curved into a curvature direction perpendicular to the first straight line. The holding portion has a first face and, a second face making a predetermined angle to the first face. A plurality of first ports are one-dimensionally arranged along the first straight line on the first face. A plurality of second ports are one-dimensionally arranged along the first straight line on the second face. One end faces of the MCFs are held in the first ports as aligned each with the first face, while the other end faces of the MCFs are held in the second ports as aligned each with the second face. Namely, each of the "ports" to hold the end faces of the MCFs is used as an "entrance port" or "exit port."

Advantageous Effects of Invention

The embodiment of the invention can provide the optical interconnection component capable of more easily implementing the optical connection between the cores in each of the MCFs and an optical engine with higher accuracy. There is no need for alignment of each of the MCFs in manufacture of the optical interconnection component as long as the MCFs are arranged at determined positions. Furthermore, in connection and fixing to an optical device or the like, the optical fibers requiring cumbersome handling can be integrally connected via the multicore-multicore connector, which facilitates handling.

BRIEF DESCRIPTION OF DRAWINGS

FIGS. 1A and 1B are a schematic perspective view and a partly enlarged view for explaining a configuration of the optical interconnection component according to the first embodiment.

FIGS. 4A and 4B are a schematic perspective view and a side view for explaining a configuration of the optical interconnection component according to the second embodiment.

DESCRIPTION OF EMBODIMENTS

Figure 2:
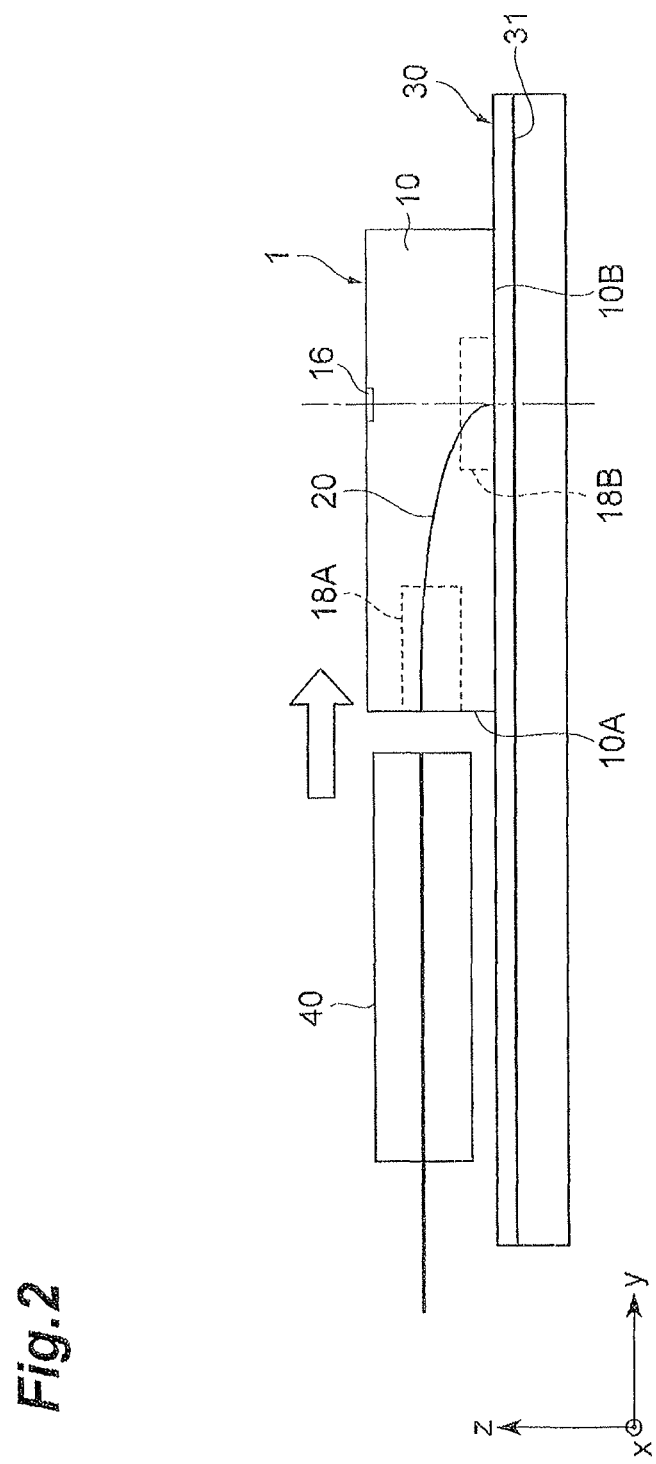
FIG. 2 is a drawing schematically showing an attachment method of the optical interconnection component according to the first embodiment.

Each of embodiments of the present invention will be described below in detail with reference to the accompanying drawings. In the description of the drawings the same elements will be denoted by the same reference signs, without redundant description.

DESCRIPTION OF ASPECTS OF EMBODIMENT OF INVENTION

First, aspects of the embodiment of the invention will be described as enumerated below.

The optical interconnection component according to the present invention, (1): comprises a plurality of MCFs, and a holding portion (molded portion) for holding these MCFs in a curved state. Each of the plurality of MCFs includes a plurality of cores extending along a longitudinal direction thereof. The holding portion is comprised of a predetermined plastic material (molded material) covering each of the MCFs. The holding portion integrally holds the plurality of MCFs inside while relative positions among the MCFs are fixed. Particularly, in the embodiment of the invention, each of the plurality of MCFs has a core arrangement comprised of first linear arrangement elements including two or more cores arranged on a first straight line, in a cross section thereof perpendicular to the longitudinal direction, and a curve portion curved into a direction perpendicular to the first straight line. The holding portion has a first face and, a second face making a predetermined angle to the first face. A plurality of first ports are one-dimensionally arranged along the first straight line on the first face. A plurality of second ports are one-dimensionally arranged along the first straight line on the second face. One end faces of the MCFs are held in the first ports as aligned each with the first face, while the other end faces of the MCFs are held in the second ports as aligned each with the second face.

In the foregoing optical interconnection component, one ends of the MCFs are supported in a rotationally-aligned state in the first ports, while the other ends of the MCFs are supported in a rotationally-aligned state in the second ports. Since the holding portion is integrally molded together with the MCFs, the optical interconnection component is obtained with the MCFs at the rotational position controlled with higher accuracy than by the conventional technologies. Furthermore, we can obtain the optical interconnection component as an optical-path-direction-changing connector in a smaller size. With this configuration, the optical interconnection component makes it feasible to achieve low-loss connection to an optical component such as a multi-fiber or single-fiber connector similarly aligned in a core rotation direction.

(2): The optical interconnection component described in (1) may be configured in a mode wherein the curve portions of the respective MCFs are portions resulting from a curving process by heating. The curving process by heating relieves stress strain in the MCFs. In this case, it becomes feasible to prevent aging strength degradation, which is a problem, particularly, when the MCFs are curved in a small radius of less than 5 mm or the like.

(3): The optical interconnection component described in at least either one of (1) and (2) can also be configured in a mode wherein the optical interconnection component further comprises a first arrangement member for holding one ends of the MCFs so as to match the one-dimensional arrangement of the first ports on the first face and wherein the first arrangement member is integrally held together with the MCFs by the holding member. The optical interconnection component described in either one of (1) and (2) may also be configured in a mode wherein the optical interconnection component further comprises a second arrangement member for holding the other ends of the MCFs so as to match the one-dimensional arrangement of the second ports on the second face and wherein the second arrangement member is integrally held together with the MCFs by the holding member. When the positions of the MCFs are fixed by the holding portion in this manner, the MCFs can be connected to another optical interconnection component with higher accuracy and downsizing of the entire optical interconnection component can be promoted.

(4): The optical interconnection component described in at least any one of (1) to (3) can also be configured in a mode wherein a first marker indicative of positions of the first ports is provided on a third face different from both of the first and second faces, of the holding member. As an example, when the first face is a side face of the holding portion and the second face a bottom face of the holding portion (a face perpendicular to the side face), the third face is preferably a top face of the holding portion (a face perpendicular to the side face and opposed to the bottom face), with consideration to a mounted state of the optical interconnection component. When the marker is indicated on the top face of the holding portion (a face that an installing worker can visually recognize) in this manner, connection with another optical interconnection component can be carried out with higher accuracy. The optical interconnection component may be configured in a mode wherein a second marker indicative of positions of the second ports is provided on the third face of the holding member.

(5): The optical interconnection component described in at least any one of (1) to (4) can also be configured in a mode wherein a second marker indicative of positions of the second ports is provided on a third face (e.g., the top face of the holding portion) different from both of the first and second faces (e.g., the side face and bottom face of the holding portion perpendicular to each other), of the holding member. When the marker is indicated in this manner, it becomes feasible to achieve the connection of the optical interconnection component to another optical interconnection component with higher accuracy. When the marker is present on the top face of the optical interconnection component, it becomes easier to recognize the positions of the cores in the MCFs and thus the working time can be reduced for the work of connection between the optical interconnection component and another optical interconnection component.

(6): The optical interconnection component described in at least any one of (1) to (4) can also be configured in a mode wherein each of core arrangements in the respective MCFs is comprised of at least the first linear arrangement elements and, second linear arrangement elements including two or more cores arranged on a second straight line parallel to the first straight line. In this case, it is also possible to adopt a mode wherein any core belonging to the first linear arrangement elements has the same structure as a core belonging to the second linear arrangement elements and being adjacent thereto in the curvature direction. The same structure between adjacent cores means a structure in which the cores have the same refractive index, the same core diameter, and the same refractive index profile of the cladding around the cores.

Details of Embodiment of Invention

Specific examples of the optical interconnection components according to the embodiment of the invention will be described below with reference to the drawings. It should be noted that the present invention is by no means intended to be limited to these examples presented by way of illustration but is intended for inclusion of all changes within the meaning and scope of equivalency to the scope of claims, as described in the scope of claims.

First Embodiment

Figure 3A:
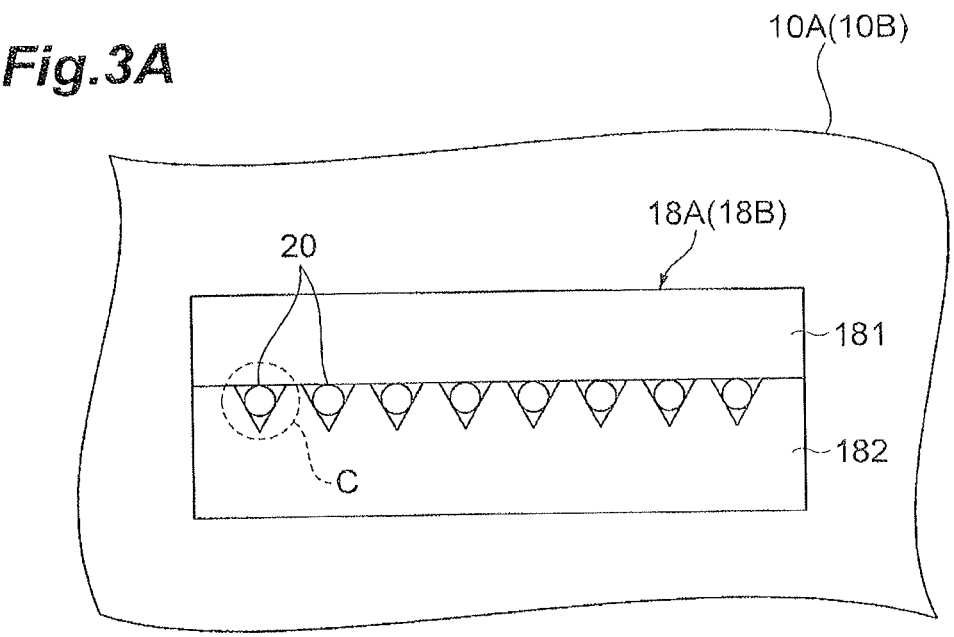
FIGS. 3A and 3B are drawings for explaining arrangement members to support fibers in the optical interconnection component according to the first embodiment.

The first embodiment of the optical interconnection component according to the present invention will be described with reference to FIGS. 1A and 1B, FIG. 2, and FIGS. 3A and 3B. FIG. 1A is a schematic perspective view for explaining the configuration of the optical interconnection component according to the first embodiment and FIG. 1B an enlarged view of region A shown in FIG. 1A. FIG. 2 is a drawing schematically showing an attachment method of the optical interconnection component. FIG. 3A is a drawing for explaining arrangement members to support fibers in the optical interconnection component and FIG. 3B an enlarged view of region C shown in FIG. 3A. The optical interconnection component 1 is a device for guiding light from optical waveguides to other optical waveguides or the like and, more particularly, a device for implementing connection to a multi-fiber connector in which a plurality of MCFs are arranged in parallel.

The optical interconnection component 1 has a holding portion 10 of a substantially rectangular parallelepiped shape comprised of a resin, and a plurality of MCFs 20 and is formed in a mode wherein the plurality of MCFs 20 are integrally molded with a plastic material as a molded material whereby the plurality of MCFs 20 are buried in the holding portion 10. In this mode, one ends of the plurality of MCFs 20, as shown in FIG. 2, are exposed each from a side face 10A of the holding portion 10 (which is one face out of the four side faces), while the other ends of the plurality of MCFs 20 are exposed each from a bottom face 10B of the holding portion 10. The plastic material making up the holding portion 10 may be a transparent material or an opaque material. In cases where the cores of the MCFs are single-mode cores and the MFD (mode field diameter) thereof is as small as several μm, the opaque material preferably contains a filler, in order to suppress expansion/contraction due to temperature. A plurality of holes on the side face 10A side (first ports) in the holding portion 10, where one end faces of the MCFs 20 are exposed, function as first entrance/exit ports, while a plurality of holes on the bottom face 10B side (second ports) in the holding portion 10, where the other end faces of the MCFs 20 are exposed, function as second entrance/exit ports.

As shown in FIG. 1A, the optical interconnection component 1 is an eight-fiber connector in which eight MCFs 20 are arranged and the holding portion 10 is provided with guide pin holes 12 to be used in connection to another optical interconnection component (e.g., a multi-fiber connector), on both sides of the optical fiber arrangement.

The optical interconnection component 1 is a so-called optical-path-changing type optical interconnection component and, as shown in FIG. 2, can be used as a surface-mounted optical interconnection component. Namely, the bottom face 10B side of the holding portion 10 (with the plurality of second entrance/exit ports) is optically connected to optical waveguides 31 provided in a substrate 30. In this case, an optical element such as a diffraction grating may be provided between the optical waveguides 31 and the plurality of entrance/exit ports. The side face 10A side (with the plurality of first entrance/exit ports) provided with the guide pin holes can be connected to a multi-fiber connector 40 attached to leading ends of MCFs. In this case, position alignment can be performed using the guide pin holes 12 as common reference positions to the connector 40 and the optical interconnection component 1.

The eight MCFs 20 arranged in parallel in the optical interconnection component 1 are integrally held each in a curved state in the holding portion 10. At each of the one ends of the MCFs 20, an end face thereof is exposed through the first port from the side face 10A of the holding portion 10. At each of the other ends of the MCFs 20, an end face thereof is exposed through the second port from the bottom face 10B of the holding portion 10. On the other hand, the MCFs 20 are buried each in the plastic material except for the exposed end faces, whereby each of the MCFs 20 is fixed in the holding portion 10. Specifically, the MCFs 20 are fixed in the holding portion 10 while they are in close contact with the resin to become the plastic material making up the holding portion 10 by mold forming as described below. The MCFs 20 are prevented from being affected by water in air, different from a state in which the MCFs from which a coating is removed are exposed in the atmosphere. Therefore, the present embodiment reduces risks of fracture of the MCFs. Since each of the MCFs 20 is fixed in the holding portion 10 by mold forming, it is also feasible to avoid loss variation due to bending of the MCFs 20 for some reason.

Each of the MCFs 20, as shown in FIG. 1B, has eight cores 21 and, a cladding 25 surrounding these cores 21. A coating material may be provided outside the cladding 25. The coating material has low heat resistance in general, and thus the coating material may be preliminarily removed, so as to improve the heat resistance. The cores 21 have a circular cross section and extend in the fiber axis direction (longitudinal direction). The eight cores 21 are grouped into four cores 21A (constituting first linear arrangement elements) arranged on one straight line (first straight line parallel to the x-axis) and four cores 21B (constituting second linear arrangement elements) arranged on another straight line (second straight line parallel to the x-axis and the first straight line). Namely, the core arrangement in the cross section of each MCF 20 has a structure in which the first linear arrangement elements to which the cores 21A belong and the second linear arrangement elements to which the cores 21B belong are arranged in parallel to each other along the x-axis. The refractive index of each of the cores 21 is higher than that of the cladding 25.

Each of the cores 21 and the cladding 25 consists primarily of silica glass and is doped with an impurity for adjustment of refractive index as needed. For example, each of the cores 21 may be made of silica glass doped with $GeO_2$ and the cladding 25 may be made of pure silica glass. As another example, each of the cores 21 may be made of pure silica glass and the cladding 25 may be made of silica glass doped with the element F. The core diameters of the respective cores 21 may be identical or different. The refractive indices of the respective cores 21 may be identical or different.

The refractive index of the plastic material making up the holding portion 10 may be the same as that of the claddings 25 of the MCFs 20 or may be slightly higher than that of the claddings 25. When the holding portion 10 has the same refractive index as the claddings 25, it can function as part of the claddings. When the refractive index of the holding portion 10 is slightly higher than that of the claddings 25, it is effective in removing light leaking from the cores 21.

As shown in FIG. 1A, there are marker lines 15A, 15B, and 16 indicative of the arrangement of the MCFs 20 in the optical interconnection component 1, provided on the top face of the optical interconnection component 1. Among them, the marker lines 15A and 15B indicate the positions of the MCFs 20 at two ends out of the eight MCFs 20 arranged on a line on the side face 10A side. The marker line 16 indicates the arrangement of the end faces of the MCFs 20 on the bottom face 10B side (the positions of the second entrance/exit ports). Since the marker lines 15A, 15B, and 16 are to be used in connection with another optical interconnection component, they are preferably provided on a face different from the side face 10A provided with the guide pin holes 12 and from the bottom face 10B. Particularly, the marker lines provided on the top face of the holding portion 10 are suitably used for connection with another optical interconnection component.

Preferably, the marker lines 15A, 15B, and 16 are not formed in a buried state in the holding portion 10 but are provided on the surface of the plastic material molded in a state in which the MCFs 20 are buried. Since the marker lines 15A, 15B, and 16 indicate the arrangement of the MCFs 20 as described above, they may be formed as projections. The marker lines 15A, 15B, and 16 may be formed, for example, in a groove shape but they are preferably formed in a state with neither depression nor projection in terms of dust prevention.

In the optical interconnection component 1 of the present embodiment, the marker lines are illustrated in the line form but the required function of the markers is to be able to indicate the positions of the MCFs 20 at the ends. For this reason, for example, the markers may have a dotted line shape and there are no particular restrictions on the shape of the lines. For accurately grasping the core positions, the thickness of the lines is preferably as small as possible, but it may be one enough to be recognized.

For forming the curve portion in advance for each of the MCFs 20 shown in FIGS. 1A and 1B, each MCF 20 is subjected to a thermal treatment with the two ends being in a fixed state after rotational alignment. This thermal treatment subjects each of the MCFs to a curving process with a predetermined curvature direction, radius of curvature, and curvature angle. The MCFs 20 after the curving process are fixed in a state in which the two ends thereof are accurately arranged at the predetermined positions in the side face 10A and in the bottom face 10B. In the state in which the two ends of the MCFs 20 are arranged at the predetermined positions in the side face 10A and in the bottom face 10B, the two ends of the MCFs 20 are kept projecting from the side face 10A and the bottom face 10B. The MCFs 20 with the two ends fixed in this manner are integrally molded with the plastic material covering the MCFs 20, thereby forming the holding portion 10. The curving process is such processing that a plurality of locations in a region of each MCF 20 to be curved are successively heated with infrared laser light whereupon the MCF is gradually curved in conjunction with the heating process for each of the locations.

Figure 3B:
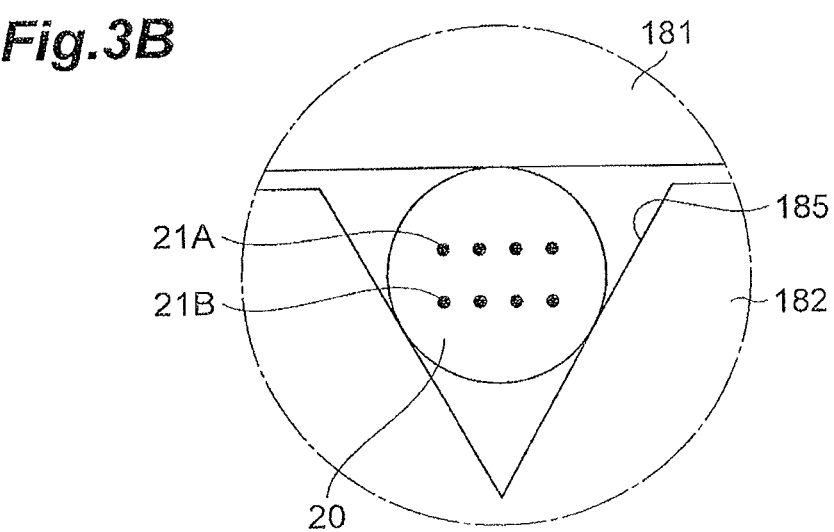

FIG. 3A is a drawing for explaining the configuration of the arrangement members and is, for example, a plan view of the arrangement member 18A when the side face 10A side is viewed. FIG. 3B is an enlarged view for explaining a method for supporting the MCFs in the arrangement members. Each of the arrangement members 18A, 18B is composed of a lid member 181 functioning as a lid, and an arrangement member 182 in which V-shaped grooves 185 are formed as many as the number of MCFs 20 arranged (eight in the present embodiment). As shown in FIG. 3B, the MCFs 20 are arranged on the V-grooves 185 in a state after completion of the curving process and rotational alignment so that their core arrangements are aligned along the one-dimensional array of the first entrance/exit ports. This FIG. 3B shows an example in which the end of the MCF 20 is rotationally aligned so that each of the row (first linear arrangement elements) to which the four cores 21A belong and the row (second linear arrangement elements) to which the four cores 21B belong, among the eight cores 21, is parallel to the surface of the arrangement member 182 (the surface where the V-grooves 185 are formed).

For supporting the ends of the MCFs 20 by the arrangement member 18A, the other one ends of the respective MCFs 20 are mounted on the V-grooves 185 of the arrangement member 182 after completion of the rotational alignment and are fixed by the lid member 181 from top. Likewise, the other ends of the MCFs 20 are also supported in the same manner by the arrangement member 18B.

Thereafter, each of the MCFs 20 with the arrangement members 18A, 18B attached to their two ends is subjected to mold forming, thereby obtaining the optical interconnection component 1. The eight MCFs are preferably subjected each to the curving process by the heating method or the like before the mold forming. When the curving process is carried out, curvature is preferably given into the curvature direction (the z-axis direction in FIG. 1B) perpendicular to the arrangement direction of the MCFs 20 (e.g., the x-axis direction in FIG. 1B), so as to preferably reduce influence of crosstalk due to the curvature. Since the MCFs 20 are subjected to the curving process by heating, it is possible to prevent aging strength degradation due to stress produced in curving the MCFs 20.

The MCFs 20 may be coated each with a resin coating of the same material as the plastic material before the mold forming. In the configuration wherein the surfaces of these MCFs 20 are coated with the coating, the coating functions as a stress relaxation layer on occasions of occurrence of thermal expansion/contraction of the plastic material. In terms of relaxation of stress, the plastic material itself is also desirably comprised of a material resistant to thermal expansion to the same extent as the fibers.

In the case of the optical interconnection component 1 obtained through the above-described manufacture steps, it is considered that, in a work of connecting the ends of the plurality of MCFs 20 (the first entrance/exit ports on the side face 10A and the second entrance/exit ports on the bottom face 10B) to other optical interconnection components, one can be out of sight behind the other, which can be a hindrance to the connecting work. Even in the case where the other optical interconnection component is located in the shade behind the optical interconnection component 1 itself in checking the core positions of the target component, rough alignment can be implemented as a pre-stage for precise alignment as long as the positions can be roughly recognized by the presence of the markers on the optical interconnection component 1. The core pitch in each MCF is several ten μm and if a worker performs the position alignment by feeling, there is a high risk of connecting the cores to neighboring cores with a shift from connection targets. For avoiding it, it becomes necessary to perform rough confirmation of positions between all the cores in the arrangement direction of the cores, which takes an immense amount of time for alignment. Since the marker lines 15A, 15B, 16 in the present embodiment allow the central positions of the MCFs 20 to be indirectly confirmed even in the case where the MCFs 20 cannot be directly seen, the rough alignment can be performed in a shorter time. A mounting device may be used in connecting the optical interconnection component 1 to another optical interconnection component, in order to enable short-time position alignment by optical confirmation of the marker positions and confirmation of the core positions.

Second Embodiment

Figure 5:
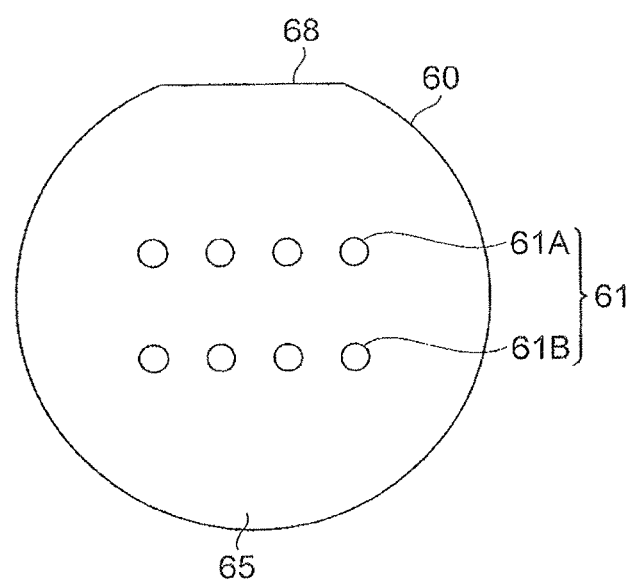
FIG. 5 is a cross-sectional view of an MCF applicable to the optical interconnection component according to the second embodiment.
Figure 6A:
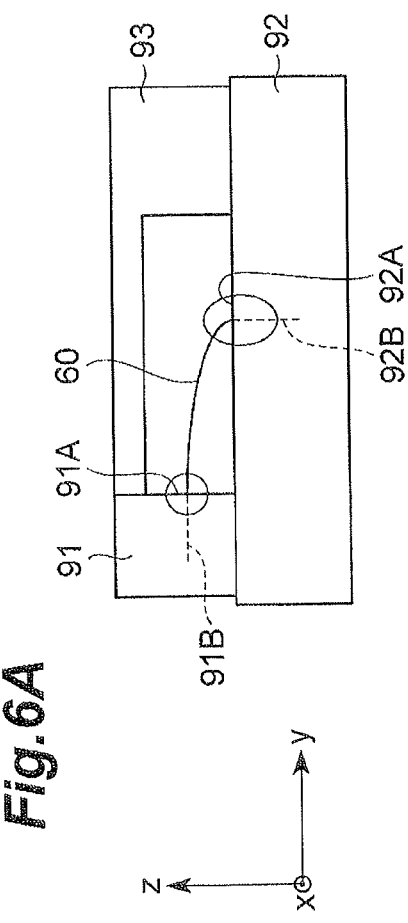
FIGS. 6A and 6B are drawings schematically showing a method for manufacturing the optical interconnection component according to the second embodiment.
Figure 6B:
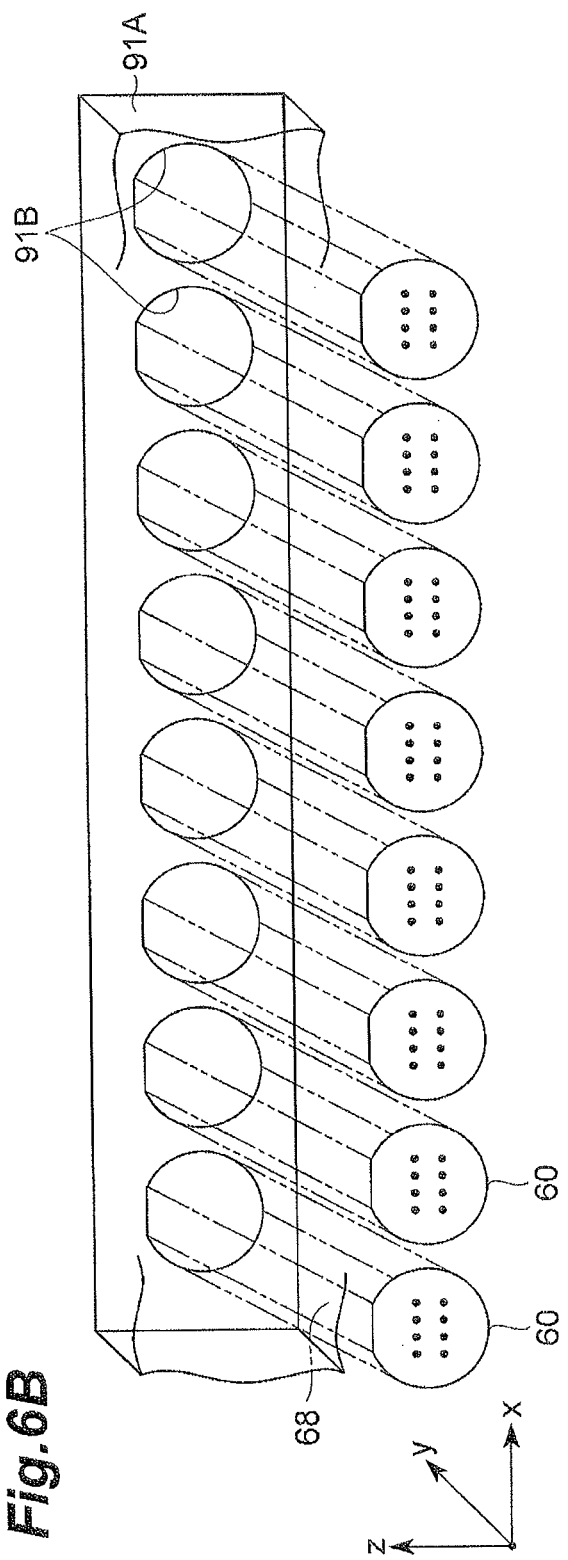

Next, the second embodiment of the optical interconnection component according to the present invention will be described with reference to FIGS. 4A and 4B, FIG. 5, and FIGS. 6A and 6B. FIG. 4A is a schematic perspective view for explaining the configuration of the optical interconnection component 2 according to the second embodiment and FIG. 4B a side view thereof. FIG. 5 is a cross-sectional view of the MCF applicable to the optical interconnection component according to the second embodiment. FIGS. 6A and 6B are drawings schematically showing the method for manufacturing the optical interconnection component according to the second embodiment.

The optical interconnection component 2 of the second embodiment is different in the following points from the optical interconnection component 1 of the first embodiment. Namely, the optical interconnection component 2 is significantly different from the optical interconnection component 1 in that the optical interconnection component 2 does not include the arrangement members 18A, 18B. In connection thereto, the contour of each MCF in the optical interconnection component 2 is also different from that in the optical interconnection component 1 and the method for manufacturing the optical interconnection component 2 is also different in part from that for the optical interconnection component 1.

As shown in FIGS. 4A and 4B, the eight MCFs 60 arranged in parallel are also fixed each in the holding portion 10 in the optical interconnection component 2. In this fixed state, one ends of the respective MCFs 60 are exposed from the side face 10A of the holding portion 10 and the other ends of the respective MCFs 60 are exposed from the bottom face 10B of the holding portion 10. The portions between the one ends and the other ends extend in a curved state from the side face 10A to the bottom face 10B.

However, each of the MCFs 60 applied to the optical interconnection component 2 has eight cores 61 and a cladding 65 surrounding these cores 61. The eight cores 61, as shown in FIG. 5, are grouped into four cores 61A (constituting first linear arrangement elements) arranged on one straight line (first straight line parallel to the x-axis) and four cores 61B (constituting second linear arrangement elements) arranged on another straight line (second straight line parallel to the x-axis and the first straight line). Namely, they are the same as the MCFs 20 in that in the cross section of each of the MCFs 60, the cores 61A belonging to the first linear arrangement elements and the cores 61B belonging to the second linear arrangement elements are provided in parallel along the x-axis. On the other hand, each MCF 60, compared to each MCF 20, is provided with a cut part 68 extending in parallel to both of the first linear arrangement elements and the second linear arrangement elements. Each MCF 60 is different in this respect from each MCF 20. The cut part 68 is formed on the side face of each MCF 60 along the fiber axis (coincident with the longitudinal direction of each MCF 60), in order to control the rotational direction of each MCF 60. The rotational direction of each MCF 60 means a direction of rotation around the longitudinal direction as a center in the cross section of each MCF 60 perpendicular to the longitudinal direction. In the cross section of each MCF 60, an angle between the cut part 68 and the extending direction of the first and second linear arrangement elements (the direction along the x-axis) is preferably not more than 1°. With use of the MCFs 60 having the modified peripheral shape, it becomes feasible to control the rotational direction of each MCF 60.

Each of the cores 61 and the cladding 65 consists primarily of silica glass and is doped with an impurity for adjustment of refractive index as needed, just as in the example of the optical interconnection component 1. The refractive indices of the respective cores 61 may be identical or different.

In manufacturing the optical interconnection component without use of the arrangement members 18 as in the case of the optical interconnection component 2, the MCFs are inserted into arrangement holes formed in advance in a mold to be used in the mold forming, and thereafter the plastic material is poured into the mold.

Specifically, as shown in FIG. 6A, the MCFs 60 are supported by die 91 and die 92, the contour of the holding portion 10 is then formed by die 93, and thereafter the plastic material is poured into an internal space defined by the dies 91 to 93. In this regard, the die 91 is provided with insertion holes 91B for the one ends of the MCFs 60 to be inserted, in an inner wall surface 91A facing the internal space (an inner wall surface facing the space into which the plastic material is poured). Similarly, the die 92 is provided with insertion holes 92B for the other ends of the respective MCFs 60 to be inserted, in an inner wall surface 92A facing the internal space (an inner wall surface facing the space into which the plastic material is poured). The insertion holes 91B, 92B are processed in the shape corresponding to the MCFs 60 having the cut part 68. FIG. 6B schematically shows the surface (inner wall surface) 91A of the die 91 in a state in which the MCFs 60 are inserted in the insertion holes 91B. Since each MCF 60 has the cut part 68 and the shape of each of the insertion holes 91B coincides with the cross-sectional shape of each MCF 60, each MCF 60 can be attached to the die 91 while the core arrangement is rotationally controlled. For the same reason as in the first embodiment, each MCF 60 is preferably subjected to the curving process to curve it into the direction perpendicular to the core arrangement direction (the extending direction of the first and second linear arrangement elements) by heating, before mounted (i.e., before integrally molded with the plastic material).

In this manner, each of the MCFs 60 is attached to the dies 91, 92, the contour of the optical interconnection component 2 (the contour of the holding portion 10) is formed by the dies 91-93, and the plastic material is poured into the internal space defined by the dies 91-93, thereby obtaining the optical interconnection component 2. On the occasion of detaching the optical interconnection component 2 from the dies 91-93, the MCFs 60 inserted in the die 91 and in the die 92 are cut off to be removed. It is desired to subject the end faces of MCFs 60 after the cutoff removal to a polishing process.

FIGS. 6A and 6B illustrated the configuration wherein the dies 91, 92 had their respective insertion holes 91B, 92B, but the mold forming in the present invention does not have to be limited to this configuration. Another example of the mold forming is a configuration wherein each of the MCFs 60 is supported outside the space to be the region defining the contour of the optical interconnection component 2 (the internal space defined by the dies) and in this state the plastic material is poured into the internal space. For example, each of the MCFs 60 may be fixed as arranged on a line by fixing members different from the dies 91, 92. An example of the fixing members applicable herein is members of the same shape as the arrangement members 18.

The above described the optical interconnection components according to the present invention but it should be noted that the optical interconnection components according to the present invention are not limited to the above embodiments. For example, the optical interconnection components in the above embodiments illustrated the optical interconnection components in which the MCFs were buried, but the optical fibers to be buried do not have to be limited to the multi-core fibers and may be, for example, single-core optical fibers. When each of the plurality of optical fibers has the cross-sectional structure, for example, with two- or more-fold rotational symmetry, they can be arranged with directions of rotational symmetry being aligned in the optical interconnection components according to the embodiment of the invention. The optical fibers to be used in the optical interconnection components are useful when they are fibers with a polarization maintaining function, or so-called constant-polarization fibers.

The above embodiments illustrated the cases where the arrangement of the MCFs was the same in the both end faces (the side face 10A side and the bottom face 10B side), but it is possible to adopt different arrangements; for example, the fiber-fiber pitches may be different. It is also possible to adopt a configuration wherein only one end side of each MCF is subjected to etching to remove part of the cladding, so as to make the pitch smaller.

REFERENCE SIGNS LIST 1, 2 optical interconnection components; 10 holding portion; 15A, 15B, 16 marker lines; 18, 18A, 18B arrangement members; 20, 60 MCFs (multi-core optical fibers); 21 (21A, 21B), 61 (61A, 61B) cores; 25, 65 claddings; 68 cut part; 91-93 dies.

The invention claimed is:

1. An optical interconnection component comprising:
a plurality of multi-core optical fibers each of which includes a plurality of cores extending along a longitudinal direction thereof; and
a holding member comprised of a predetermined plastic material covering each of the plurality of multi-core optical fibers and configured to integrally hold the plurality of multi-core optical fibers inside while relative positions among the plurality of multi-core optical fibers are fixed,
wherein each of the plurality of multi-core optical fibers has a core arrangement comprised of first linear arrangement elements including two or more cores arranged on a first straight line, in a cross section thereof perpendicular to the longitudinal direction, and a curve portion curved into a curvature direction perpendicular to the first straight line,
wherein the holding member has a first face on which a plurality of first ports are one-dimensionally arranged along the first straight line, a second face which makes a predetermined angle to the first face and on which a plurality of second ports are one-dimensionally arranged along the first straight line, and a third face different from both of the first and second faces, the third face located opposite the second face and having a first marker indicative of positions of the first ports, and
wherein one end faces of the plurality of multi-core optical fibers are held in the first ports as aligned each with the first face, and the other end faces of the plurality of multi-core optical fibers are held in the second ports as aligned each with the second face.

2. The optical interconnection component according to claim 1, wherein the curve portions of the respective multi-core optical fibers are portions resulting from a curving process by heating.

3. The optical interconnection component according to claim 1, comprising a first arrangement member for holding one ends of the multi-core optical fibers so as to match the one-dimensional arrangement of the first ports on the first face,
wherein the first arrangement member is integrally held together with the multi-core optical fibers by the holding member.

4. The optical interconnection component according to claim 1, comprising a second arrangement member for holding the other ends of the multi-core optical fibers so as to match the one-dimensional arrangement of the second ports on the second face,
wherein the second arrangement member is integrally held together with the multi-core optical fibers by the holding member.

5. The optical interconnection component according to claim 1, having a second marker indicative of positions of the second ports, which is provided on the third face of the holding member.

6. The optical interconnection component according to claim 1, having a second marker indicative of positions of the second ports, which is provided on the third face different from both of the first and second faces, of the holding member.

7. The optical interconnection component according to claim 1, wherein each of core arrangements in the respective multi-core optical fibers is comprised of at least the first linear arrangement elements and, second linear arrangement elements including two or more cores arranged on a second straight line parallel to the first straight line, and
wherein any core belonging to the first linear arrangement elements has the same structure as a core belonging to the second linear arrangement elements and being adjacent thereto in the curvature direction.

* * * * *